Feb. 9, 1965   E. J. DE RIDDER ETAL   3,168,777
METHOD OF MAKING DISTRIBUTION TRANSFORMER CASINGS
Filed June 7, 1960   3 Sheets-Sheet 1

INVENTORS
ERNST J. DE RIDDER
WILLIAM B. MC MULLIN
BY Glenn & Jackson

THEIR ATTORNEYS

Feb. 9, 1965 E. J. DE RIDDER ETAL 3,168,777
METHOD OF MAKING DISTRIBUTION TRANSFORMER CASINGS
Filed June 7, 1960 3 Sheets-Sheet 2

INVENTORS
ERNST J. DE RIDDER
WILLIAM B. MC MULLIN
BY
THEIR ATTORNEYS

Feb. 9, 1965   E. J. DE RIDDER ETAL   3,168,777
METHOD OF MAKING DISTRIBUTION TRANSFORMER CASINGS
Filed June 7, 1960   3 Sheets-Sheet 3

INVENTORS
ERNST J. DE RIDDER
WILLIAM B. MC MULLIN
BY Glenn & Jackson
THEIR ATTORNEYS United States Patent Office 3,168,777
Patented Feb. 9, 1965

3,168,777
METHOD OF MAKING DISTRIBUTION TRANSFORMER CASINGS
Ernst J. De Ridder and William B. McMullin, Henrico County, Va., assignors to Reynolds Metals Company, Richmond, Va., a corporation of Delaware
Filed June 7, 1960, Ser. No. 34,429
10 Claims. (Cl. 29—157.3)

This invention relates to an improved distribution transformer construction and/or improved tank, and method for producing the same.

This invention also provides a transformer construction and/or tank, in which the tank is light in weight and has a strong and non-corrosive body, the main parts of which are made by a very efficient and economical method which may include an easy and simple extrusion of aluminum containing metal parts of novel construction.

In general, the distribution transformer tank of this invention comprises, a strong, light, extruded, substantially cylindrical hollow body formed from a one-piece extrusion or a plurality of elongated extruded arcuate sections suitably secured together for housing and supporting an electrical transformer disposed therein. Such body may be formed of strong, light, non-corrosive, aluminum containing metal material. The body of the tank is so constructed that a plurality of longitudinal disposed and outwardly extending heat exchanger-like elements are respectively formed integrally with adjacent portions of the body, the elements dissipating the heat generated by the transformer.

Certain of these heat exchanger elements also function as the tank mounting means while others provide lifting means for the tank. By forming the heat exchanger elements together with the respective adjacent portions of the body and utilizing at least some of the thus formed elements for other purposes, the manufacturing costs of such a transformer tank are greatly reduced.

Further, by forming certain longitudinally disposed and inwardly projecting mounting brackets integral with adjacent portions of the tank body for detachably mounting and supporting the transformer inside the tank, other manufacturing costs are also greatly reduced over the prior known structures and methods.

Accordingly, it is an object of this invention to provide an improved distribution transformer and/or tank having one or more of the novel features set forth above and/or hereinafter shown or described.

Another object of this invention is to provide an improved method for producing such an improved distribution transformer and/or tank or the like.

Other objects, uses, and advantages of this invention are apparent from a reading of this description and the accompanying drawings forming a part thereof and wherein:

FIGURE 1 is a perspective view illustrating the distribution transformer tank of this invention detachably secured to a transmission pole or the like.

FIGURE 1 illustrates an improved distribution transformer tank 20, formed in accordance with the teachings of this invention and mounted or suspended detachably on a transformer pole 27.

Figure 2:
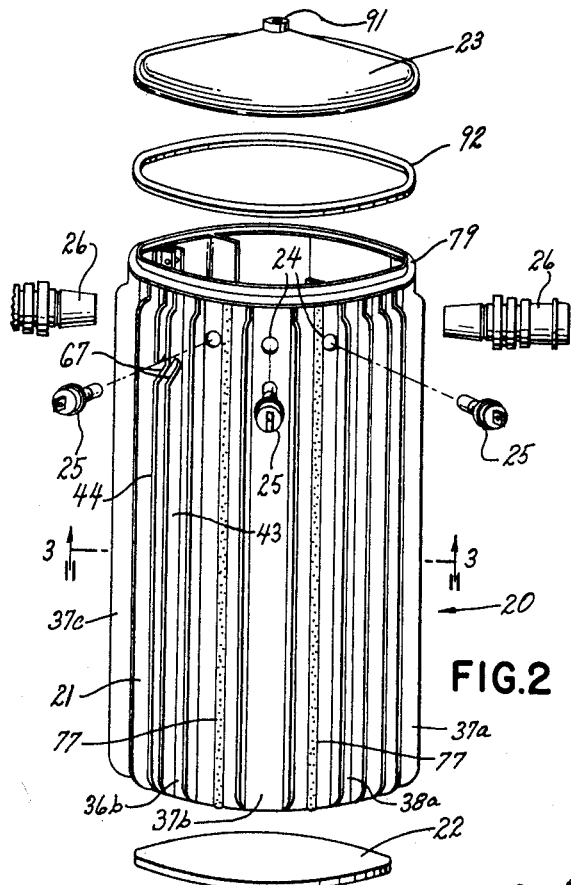
FIGURE 2 is an exploded perspective view illustrating certain of the parts of the transformer tank of this invention.

The transformer tank 20 is shown in the exploded view of FIGURE 2, and includes a substantially cylindrical body 21, a bottom 22, and a cover 23 whereby a suitable transformer is adapted to be completely sealed within the tank 20.

The body 21 is suitably bored, as at 24, whereby low voltage outlet leads 25 and high voltage inlet leads 26 are detachably secured to the body 21 and interconnected to the transformer. In this manner when the transformer tank 20 is detachably secured to a transmission pole 27 or the like, the high voltage lines are interconnected to the leads 26 while the low voltage lines are interconnected to the leads 25.

Since a large amount of heat is generated by the transformer when the transformer is operating, the tank is usually filled with a cooling medium, such as oil or the like. In order to dissipate the heat absorbed by the cooling medium, heat exchanger elements or fins are formed integrally with adjacent portions of the body 21 and project outwardly therefrom. These fins will be more specifically described and designated as the description proceeds.

The body 21 is formed from metal, such as aluminum alloys of aluminum and the like, and preferably is produced by extrusion means such as shown in FIGURES 12–17.

Figure 12:
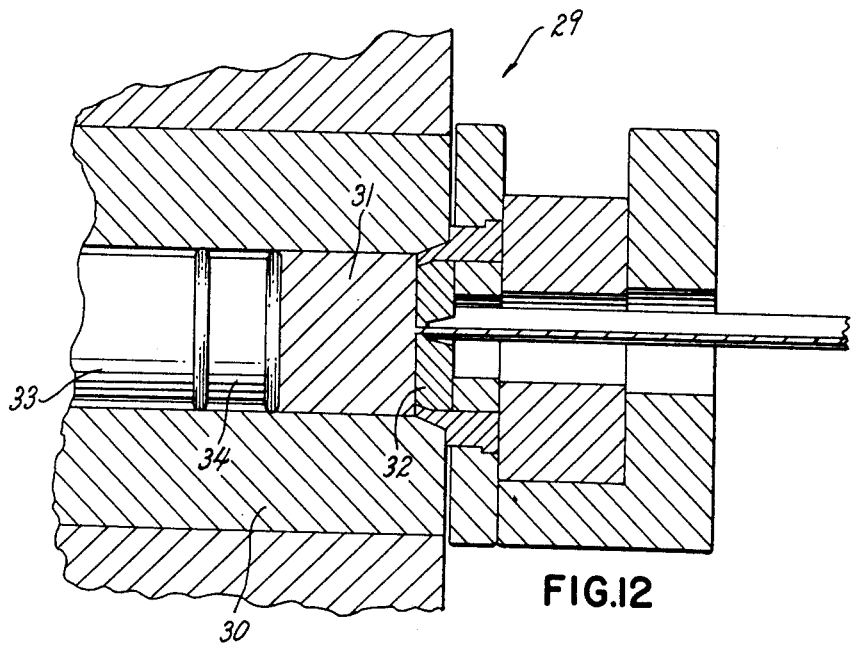
FIGURE 12 is an axial cross-sectional view illustrating the method of extruding certain parts of this invention.
Figure 13:
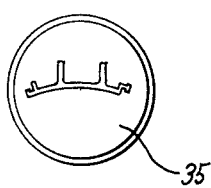
Figure 14:
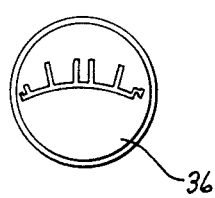
Figure 15:
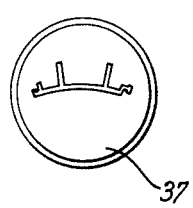
Figure 16:
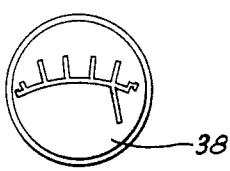

FIGURE 12 shows a conventional extruding apparatus 29 suitable for use with this invention which comprises a liner 30 for receiving a billet 31 of extrudable material, a die member 32, and a hydraulically or mechanically operated ram 33 and dummy block 34 for forcing the extrudable material through the opening in the die member 32 which is representative of the various dies shown in FIGURES 13–17, to form extruded articles of the desired cross-sectional configuration. By merely changing the die member 32, the apparatus 29 can extrude different parts for use with this invention.

Figure 3:
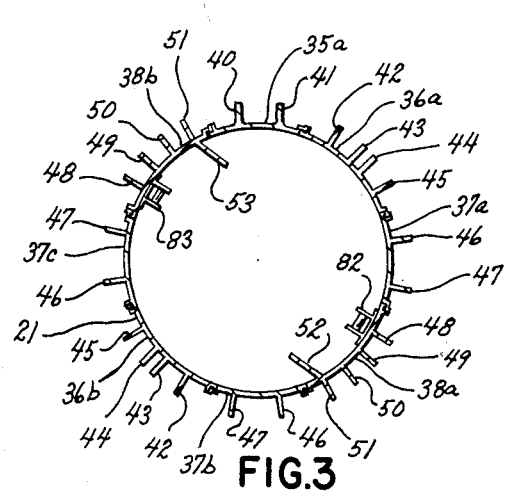
FIGURE 3 is an axial cross-sectional view of the tank illustrated in FIGURE 2 and is taken on line 3—3 thereof.
Figure 17:
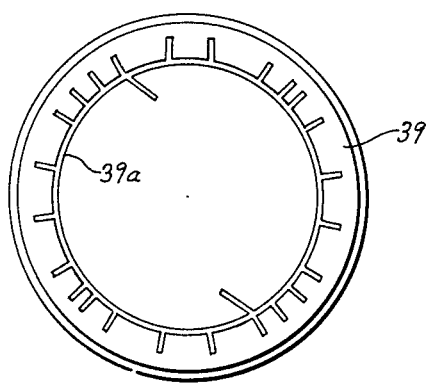
FIGURES 13, 14, 15, 16 and 17 are respectively end views of the various dies for forming the extruded parts of this invention.

When it is desired to form the body 21 from a plurality of elongated arcuate sections, as shown FIGURE 3, the die members 35, 36, 37 and 38 illustrated in FIGURES 13–16 are utilized. However, if it is desired to form the body 21 from a one-piece extrusion, a die member 39 illustrated in FIGURE 17 is utilized. The opening 39a of die member 39 reveals the shape of such a one-piece extrusion.

It is to be understood, of course, that the size of the die members 35–39 and the apparatus 29 may vary as the size of the body 21 varies.

The embodiment of the transformer tank body 21 illustrated in FIGURES 2 and 3 comprises a plurality of extruded elongated arcuate sections 35a, 36a, 36b, 37a, 37b, 37c, 38a and 38b. The sections 35a, 36a–b, 37a–c, and 38a–b are respectively extruded through the die members 35, 36, 37 and 38, shown in FIGURES 13–16.

Figure 7:
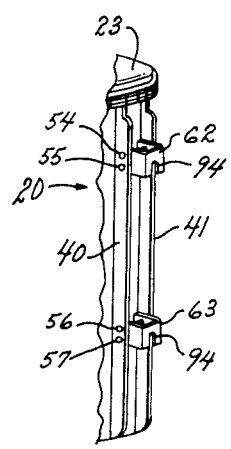
FIGURE 7 is a fragmentary view of the tank of this invention and illustrates the mounting means thereof.

The section 35a has a pair of parallel and longitudinally disposed heat exchanger elements 40 and 41 projecting outwardly from the exterior surface thereof, the elements 40 and 41 providing mounting means, FIGURE 7, for the transformer tank 20 in a manner hereinafter described.

The diametrically opposite sections 36a and 36b each have a plurality of longitudinally disposed and outwardly extending heat exchanger elements 42, 43, 44 and 45, the elements 43 and 44 being disposed substantially parallel to each other and providing lifting means 67, FIGURE 2, for the transformer tank 20 in a manner set forth hereinafter.

The sections 37a, 37b and 37c each have a plurality of longitudinally disposed and outwardly extending heat exchanger elements 46 and 47 projecting from the exterior surface thereof.

The sections 38a and 38b each have a plurality of longitudinally disposed and outwardly extending heat exchanger elements 48, 49, 50 and 51 projecting from the outer surface thereof. A pair of longitudinally disposed and inwardly directed transformer mounting brackets 52 and 53 respectively extend angularly inwardly from the sections 38a and 38b.

Since all of the heat exchanger elements or fins 40–51 are extruded with the respective arcuate sections, the elements 50–51 are formed integrally therewith and extend from opposed ends thereof. While the transformer mounting brackets 52 and 53 are illustrated as being formed integral with the sections 38a and 38b, it is to be understood that the brackets 52 and 53 may be formed separately and welded to the sections 38a and 38b since it may be desired to make them substantially shorter than the length of the tank.

Figure 9:
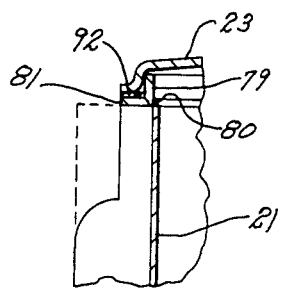
FIGURE 9 is an enlarged fragmentary view illustrating the method of securing the cover ring to the transformer tank body.
Figure 8:
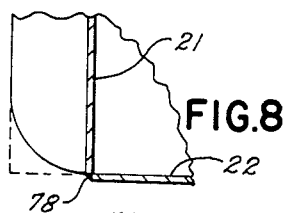
FIGURE 8 is an enlarged fragmentary view illustrating the method of securing the bottom to the transformer tank body.

After the sections 35a, 36a, 36b, 37a, 37b, 37c, 38a and 38b have been extruded in the above manner, the opposed ends of the heat exchanger elements 40–51 are each trimmed as illustrated respectively in FIGURES 8 and 9.

Subsequently, the heat exchanger elements 40 and 41 are respectively provided with transverse bores, FIGURE 7, to respectively receive bolts 54, 55, 56 and 57 for detachably fastening the legs of U-shaped transformer tank mounting devices 62 and 63 therebetween.

Figure 4:
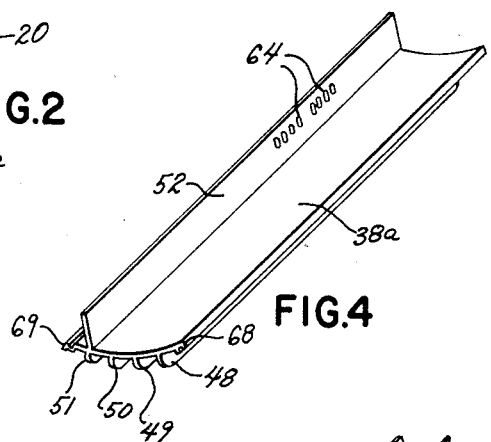
FIGURE 4 is a perspective view of one of the sections forming the tank of FIGURE 2.
Figure 5:
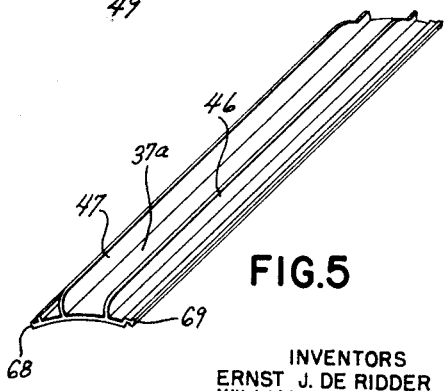
FIGURE 5 is a view similar to FIGURE 4 and illustrates another section of the tank.

In order to mount the transformer within the tank body 21, the angularly disposed mounting brackets 52 and 53, FIGURES 4 and 10, of the sections 38a and 38b are respectively provided with elongated slots or apertures 64 to subsequently detachably mount and support the transformer 65 within the tank body 21 by bolts 66.

To provide lifting means for the tank body 21, the two pairs of adjacent heat exchanger elements 43 and 44 of the sections 36a and 36b are respectively provided with upwardly extending slots 67, FIGURE 2, adjacent the upper ends thereof. In this manner lifting or hoisting ropes or chains can be looped around the pairs of elements 43 and 44 in the slots 67 thereof to raise the transformer tank 20 into position on the pole 27, FIGURE 1.

Figure 6:
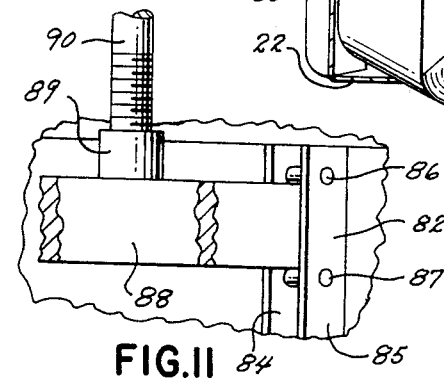
FIGURE 6 is an enlarged fragmentary typical view illustrating the nesting relation of adjacent tank sections shown in FIGURE 3.

The body 21 is formed from the sections 35a, 36a, 36b, 37a, 37b, 37c, 38a and 38b by nesting the adjacent side edges thereof in the manner illustrated in FIGURES 2 and 6. In particular, each section has been extruded with opposed side edges 68 and 69, FIGURE 6, the edge 68 having a pair of radially outwardly directed flanges 70 and 71 defining a slot 72 therebetween. The other edge 69 is formed to cooperate with an adjacent edge 68 and includes a pair of radially outwardly directed flanges 73 and 74 defining a slot 75 therebetween.

When adjacent side edges 68 and 69 of adjacent sections are interlocked together in the manner illustrated in FIGURE 6, the flange 74 is received in the slot 72 and the flange 70 is received in the slot 75, the flanges 74 and 71 being disposed in abutting relation and defining an outer surface 76.

After all of the sections 35a, 36a, 36b, 37a, 37b, 37c, 38a and 38b have been assembled together, or as each section is assembled to an adjacent section by the interlocking side edges 68 and 69 thereof, the seam between each pair of adjacent flanges 71 and 74 is welded, as at 77, to completely seal and secure the respective sections together.

Subsequently, the bottom 22 is welded to the lower end of the body 21 by an annular weld 78, FIGURE 8.

An annular cover receiving ring or retainer 79, FIGURE 9, is welded to the upper end of the body 21 by an annular weld 80 illustrated, the ring 79 being substantially L-shaped in cross section and defining an annular portion 81 resting on the upper trimmed ends of the various heat exchanger elements or fins 40–51.

In order to detachably fasten the cover 23 to the body 21, a pair of opposed brackets 82 and 83, FIGURE 3, are respectively welded to the interior surface of the body 21 adjacent the upper end thereof, and in the embodiment illustrated in FIGURE 3, the brackets are respectively secured to the arcuate sections 38a and 38b.

Figure 11:
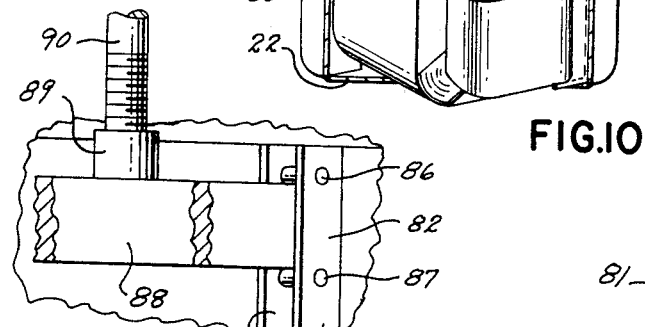
FIGURE 11 is an enlarged view of the transformer tank cover mounting means of this invention.

As illustrated in FIGURE 11, each bracket 82 and 83 includes a pair of spaced parallel plates 84 and 85 carrying a pair of transverse pins or rods 86 and 87. A bar 88 extends across the body 21 and has its ends respectively received in the brackets 82 and 83 between the pins 86 and 87. An internally threaded lug 89 is secured on the upper edge of the bar 88 intermediate the ends thereof.

Figure 10:
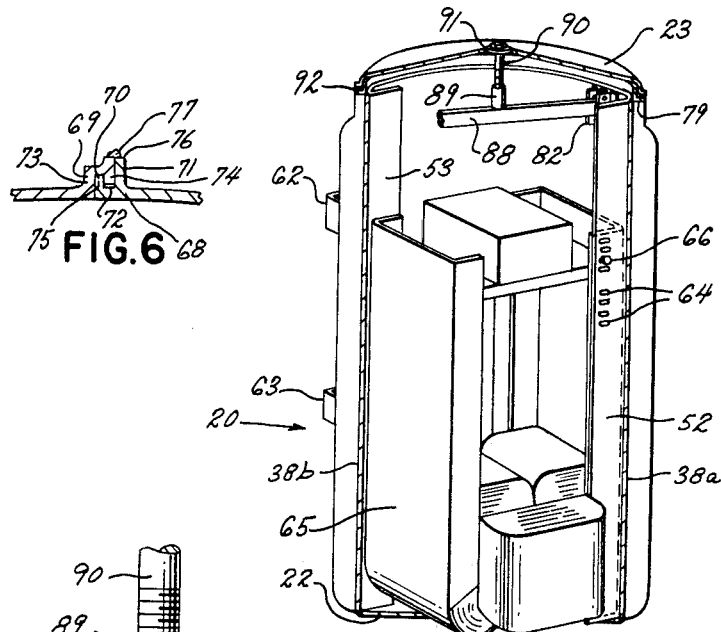
FIGURE 10 is a broken-away view of the transformer and tank of this invention.

The lug 89 is adapted to cooperate with a threaded bolt 90, FIGURE 10, passing through a centrally disposed aperture 91 formed in the dome-shaped cover 23 whereby the cover 23 can be drawn down tightly against an annular gasket 92 resting on the flange 81 of the ring 79 to completely close the body 21.

Thus, whether the body 21 is formed from a one-piece extrusion by the die 39 or from a plurality of arcuate sections, the bottom 22 and cover 23 are secured thereto in the above manner to form a completely sealed tank 20 adapted to house and support the transformer 65 and the cooling medium disposed therein.

Figure 1:
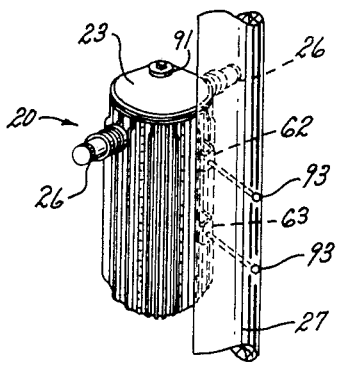

After the transformer tank 20 has been formed in the above manner, the tank 20 is lifted into position on the pole 27 by suitable ropes or the like received in the slots 67, FIGURE 2, of the elements 43 and 44. Subsequently, bolts 93, FIGURE 1, are passed through suitable transverse apertures in the pole 27 and are fastened to the U-shaped mounting devices 62 and 63 by passing through openings or slots 94, FIGURE 7. It is to be understood that suitable hooks may be formed on the ends of the bolts 93 if desired to support the tank 20 without being bolted to the same.

The transformer 65 may be of any well known construction and may be electrically connected to the high and low voltage bushings 26 and 25 and transmission lines in the usual manner.

Accordingly, it can be seen that there has been provided an improved distribution transformer and/or tank and an improved method for making the same or the like, the transformer tank of which is light, strong, non-corrosive, and has heat exchanger elements formed integrally therewith. The tank also may be utilized for a plurality of purposes.

While the form of the invention now preferred has been disclosed, as required by statute, other forms may be used, all coming within the scope of the claims which follow.

What is claimed is:
1. The method of producing a distribution transformer tank comprising the steps of forming a substantially cylindrical hollow body by extrusion, said body having a plurality of longitudinally disposed and outwardly extending heat exchanger elements formed integrally with adjacent portions of said body and extending to opposed ends of said body and having a plurality of longitudinally disposed and inwardly extending mounting brackets formed integrally with adjacent portions of said body, securing a bottom member to one of said ends of said body, directly attaching a transformer or the like to said mounting brackets with fastening means, and detachably securing a cover member to the other end of said body.

2. The method as set forth in claim 1 wherein said forming step includes the steps of extruding a plurality of elongated arcuate sections each having opposed side edges, and securing said side edges together to form said body.

3. The method for producing a distribution transformer tank comprising the steps of extruding a substantially cylindrical hollow body having a plurality of longitudinally disposed and outwardly extending heat exchanger elements formed integrally with respective adjacent portions of said body and extending to opposed ends of said body and having a plurality of longitudinally disposed and inwardly extending mounting brackets formed integrally with adjacent portions of said body, securing a bottom member to one of said ends of said body, directly attaching a transformer or the like to said mounting brackets with fastening means, and detachably securing a cover member to the other end of said body.

4. The method for producing a distribution transformer tank comprising the steps of extruding a plurality of elongated arcuate sections respectively having longitudinally disposed and outwardly extending heat exchanger elements formed integrally therewith and extending to opposed ends of said body, some of said sections also having a plurality of longitudinally disposed and inwardly extending mounting brackets formed integrally with adjacent portions of said sections, securing said sections together along adjacent side edges thereof to form a substantially cylindrical hollow body securing a bottom member to one of said ends of said body, directly attaching a transformer or the like to said mounting brackets with fastening means, and detachably securing a cover member to the other end of said body.

5. The method for producing a distribution transformer tank comprising the steps of extruding a plurality of elongated arcuate sections respectively having longitudinally disposed and outwardly extending heat exchanger elements formed integrally therewith and extending to the opposed ends thereof, some of said sections also having a plurality of longitudinally disposed and inwardly extending mounting brackets formed integrally with adjacent portions of said sections, said sections each having a pair of opposed side edges, interlocking adjacent side edges of said sections together to form a substantially cylindrical hollow body, welding said interlocked edges of said sections together, securing a bottom member to one of said ends of said body, directly attaching a transformer or the like to said mounting brackets with fastening means, and detachably securing a cover member to the other end of said body.

6. The method for producing a distribution transformer tank comprising the steps of extruding a substantially cylindrical hollow body having a plurality of longitudinally disposed and outwardly extending heat exchanger elements formed integrally with respective adjacent portions of said body and extending to opposed ends of said body and having a plurality of longitudinally disposed and inwardly extending mounting brackets formed integrally with adjacent portions of said body for supporting a transformer in said body and extending to opposed ends of said body, securing a bottom member to one end of said body, directly attaching a transformer or the like to said mounting brackets with fastening means, and detachably securing a cover member to the other end of said body.

7. The method as set forth in claim 6 and including the step of forming an angularly disposed slot in at least one of said heat exchanger elements to provide a lifting means for said body.

8. The method as set forth in claim 6 and including the step of forming angularly disposed slots in a pair of opposed adjacent pairs of said heat exchanger elements to provide lifting means for said body.

9. The method for producing a distribution transformer tank comprising the steps of extruding a substantially cylindrical hollow body having a plurality of longitudinally disposed and outwardly extending heat exchanger elements formed integrally with respective adjacent portions of said body, said elements extending between opposed ends of said body, trimming the opposed ends of said elements at the opposed ends of said body, securing a cover receiving ring to one of said ends of said body with said ring abutting the trimmed ends of said elements, securing a bottom member to the other end of said body, and detachably securing a cover member to said ring member.

10. The method for producing a distribution transformer tank comprising the steps of extruding a substantially cylindrical hollow body having a pair of spaced parallel longitudinally disposed and outwardly extending heat exchanger elements formed integrally with adjacent portions of said body and extending to the opposed ends thereof, and detachably securing at least one tank mounting device to and between said pair of elements to provide a mounting means for said body.

References Cited in the file of this patent

UNITED STATES PATENTS

| | | |
|---|---|---|
| 428,648 | Thomson | May 27, 1890 |
| 755,766 | Hall | Mar. 29, 1904 |
| 1,078,621 | House | Nov. 18, 1913 |
| 1,550,154 | Faccoili | Aug. 18, 1925 |
| 1,614,250 | Moody | Jan. 11, 1927 |
| 1,631,711 | Treanor | June 7, 1927 |
| 2,102,020 | Mossberg | Dec. 14, 1937 |
| 2,138,525 | Higham et al. | Nov. 29, 1938 |
| 2,281,207 | Schoen | Apr. 28, 1942 |
| 2,388,297 | Slaughter | Nov. 6, 1945 |
| 2,568,512 | Reilly et al. | Sept. 18, 1951 |
| 2,594,232 | Stockstill | Apr. 22, 1952 |
| 2,816,947 | Lieghtner et al. | Dec. 17, 1957 |
| 2,978,797 | Ekelund | Apr. 11, 1961 |